(12) United States Patent
Lin et al.

(10) Patent No.: US 7,771,355 B2
(45) Date of Patent: Aug. 10, 2010

(54) SYSTEM AND METHOD FOR MEDICAL IMAGING WITH ROBUST MODE SWITCHING VIA SERIAL CHANNEL

(75) Inventors: Shengtz Lin, Cupertino, CA (US); Tony Wu, San Jose, CA (US)

(73) Assignee: Sonowise, Inc., San Jose, CA (US)

( * ) Notice: Subject to any disclaimer, the term of this patent is extended or adjusted under 35 U.S.C. 154(b) by 1157 days.

(21) Appl. No.: 11/192,988

(22) Filed: Jul. 29, 2005

(65) Prior Publication Data

US 2006/0094959 A1    May 4, 2006

Related U.S. Application Data

(60) Provisional application No. 60/623,796, filed on Oct. 30, 2004.

(51) Int. Cl.
*A61B 8/12* (2006.01)
(52) U.S. Cl. .................. 600/437; 600/438; 600/440; 600/441; 600/442; 600/443; 600/444; 600/445; 600/446; 600/447; 600/450; 600/459; 600/463; 600/465; 382/128; 382/130; 382/131; 382/132
(58) Field of Classification Search ............... 600/407, 600/438, 440–447, 450–459, 463; 382/128, 382/130–132
See application file for complete search history.

(56) References Cited

U.S. PATENT DOCUMENTS

| | | | |
|---|---|---|---|
| 4,338,948 A | 7/1982 | Perez-Mendez et al. |
| 4,455,872 A | 6/1984 | Kossoff et al. |
| 5,052,394 A | 10/1991 | Carpenter et al. |
| 5,181,778 A | 1/1993 | Beller |
| 5,339,282 A | 8/1994 | Kuhn et al. |
| 5,435,312 A | 7/1995 | Spivey et al. |
| 5,437,281 A | 8/1995 | Lin et al. |
| 5,549,638 A | 8/1996 | Burdette |
| 5,551,432 A | 9/1996 | Iezzi |
| 5,664,573 A | 9/1997 | Shmulewitz |
| 5,713,356 A | 2/1998 | Kruger |
| 6,023,632 A | 2/2000 | Wilk |
| 6,080,108 A | 6/2000 | Dunham |
| 6,108,439 A | 8/2000 | Ishiguro |
| 6,117,080 A | 9/2000 | Schwartz |
| 6,190,915 B1 | 2/2001 | Madsen et al. |

(Continued)

OTHER PUBLICATIONS

Speed of sound, [online] [retrieved on Sep. 23, 2005]. Retrieved from the Internet <URL: http://www.amershamhealth.com/medcyclopaedia/medical/Volume%20I/SPEED%200F%20SOUND>.

*Primary Examiner*—Brian Casler
*Assistant Examiner*—Baisakhi Roy
(74) *Attorney, Agent, or Firm*—K&L Gates LLP

(57) ABSTRACT

In one embodiment of the invention, there is an ultrasound processing system that communicates images over a single asynchronous serial channel according to a scheme that does not require an isochronous serial channel and that switches among ultrasound imaging modes robustly. For example, the system is configured to packetize ultrasound image data of at least one ultrasound imaging mode into a stream of data frames and to convey the stream of data frames via the asynchronous channel. Each data frame includes indication of the ultrasound imaging mode and includes ultrasound-imaging-mode-specific imaging parameters. Other embodiments exist.

20 Claims, 2 Drawing Sheets

U.S. PATENT DOCUMENTS

| | | |
|---|---|---|
| 6,248,071 B1 | 6/2001 | Lin |
| 6,285,904 B1 | 9/2001 | Weber et al. |
| 6,287,259 B1 | 9/2001 | Grunwald |
| 6,322,511 B1 | 11/2001 | Guracar et al. |
| 6,338,716 B1 | 1/2002 | Hossack et al. |
| 6,540,681 B1 | 4/2003 | Cheng et al. |
| 6,547,730 B1 * | 4/2003 | Lin et al. ............... 600/437 |
| 6,701,341 B1 * | 3/2004 | Wu et al. ............... 709/200 |
| 6,780,153 B2 | 8/2004 | Angelsen et al. |
| 6,783,497 B2 | 8/2004 | Grenon et al. |
| 6,824,514 B2 | 11/2004 | Poland et al. |
| 6,839,762 B1 * | 1/2005 | Yu et al. ............... 709/230 |
| 6,926,672 B2 | 8/2005 | Moore et al. |
| 6,969,352 B2 * | 11/2005 | Chiang et al. ............... 600/437 |
| 7,266,407 B2 | 9/2007 | Li et al. |
| 2001/0027278 A1 | 10/2001 | Kaufman et al. |
| 2003/0125625 A1 | 7/2003 | Kelly et al. |
| 2003/0199765 A1 | 10/2003 | Stetten et al. |
| 2004/0006272 A1 | 1/2004 | Vortman et al. |
| 2004/0059221 A1 | 3/2004 | Azuma et al. |
| 2005/0148899 A1 | 7/2005 | Walker et al. |
| 2005/0251042 A1 | 11/2005 | Sandrin et al. |
| 2005/0256406 A1 | 11/2005 | Barthe et al. |
| 2006/0094959 A1 | 5/2006 | Lin et al. |
| 2006/0094960 A1 | 5/2006 | Phung |
| 2006/0111634 A1 | 5/2006 | Wu |
| 2007/083110 A1 | 4/2007 | Lin et al. |
| 2007/0276246 A1 | 11/2007 | Lin |
| 2008/0119735 A1 | 5/2008 | Lin et al. |

* cited by examiner

SYSTEM AND METHOD FOR MEDICAL IMAGING WITH ROBUST MODE SWITCHING VIA SERIAL CHANNEL

RELATED APPLICATION(S)

The present patent application is related to and claims the benefit of priority from commonly-owned U.S. Provisional Patent Application No. 60/623,796, filed on Oct. 30, 2004, entitled "Medical Imaging System Data Transport", which is hereby incorporated by reference in its entirety for all purposes.

TECHNICAL FIELD

The present invention relates to medical imaging. The present invention is especially relevant to medical ultrasound imaging.

BACKGROUND

Medical imaging systems are used to obtain images of a patient's body. For example, medical imaging systems based on ultrasound technology transmit high frequency sound waves into a patient's body and then receive and process returning echoes to obtain two or three dimensional images, for example, time-varying images. Medical imaging systems in general and ultrasound imaging systems in particular are known in the art.

Various types, or modalities, of imaging are known in the art. For example, there are algorithms for producing B-mode images (brightness), C-mode images (color), D-mode images (Doppler), M-mode images (motion), combination modes (e.g., B+C or B+D or B+C+D), or the like. During use, an imaging system may be switched from one mode to another at the whim of the operator (e.g., a physician or a technician).

FIG. 1 schematically illustrates a conventional ultrasound imaging system 100. The conventional system 100 includes: a front-end portion 110a that includes a scanner and a processor, and a back-end portion 112a that includes a processor. The front-end portion 110a includes, or works with, an ultrasound probe 114a. The back-end portion 112a includes, or works with, a display 116b. The conventional system 100 uses, for example, a serial bus 120 (for example, USB (Universal Serial Bus) 2.0 or IEEE1394 FireWire™) for ultrasound image data transfer between the front-end portion 110a and the back-end portion 112a. The serial bus 120 utilizes an Isochronous channel 122 for transferring image packets and an Asynchronous channel 124 for transferring Command and Control parameters. Command and Control parameters include, for example, instructions to switch into particular modes, as well as mode-specific parameters (e.g., frame size, number of zones, time sequence information, and the like) including parameters that define how to interpret the image packets of the Asynchronous channel. The Isochronous channel 122 supports a real-time, high-throughput image-data transfer, in which a data packet can be dropped if the throughput of the channel becomes problematic. There is no guarantee that any particular image packet will be transferred, but the image frames that are transferred will always be in real time. In contrast, the Asynchronous channel 124 has a lower priority in sharing the channel bandwidth and supports packet transfer without any guarantee of real-time delivery, for low-throughput command and parameter communication.

FIG. 2 schematically illustrates another conventional ultrasound imaging system 150. The conventional system 150 includes: a front-end portion 110b that includes a scanner and a processor, and a back-end portion 112b that includes a processor. The front-end portion 110b includes, or works with, an ultrasound probe 114b. The back-end portion 112b includes, or works with, a display 116b. The conventional system 150 uses a PCI bus 160 to transfer ultrasound image data and control parameters between the front-end portion 110b and the back-end portion 112b. The PCI bus is a parallel bus inside the PC motherboard that supports, e.g., a 132 Mb/s throughput rate with a critical timing requirement.

SUMMARY OF THE INVENTION

In an ultrasound medical imaging system, there is a unique requirement in which several modes (for instance, B, Color, Doppler, etc.) need to be switched in real time. Such switching creates a synchronization problem in the mode transition. In general, in the serial-bus-interface conventional system of FIG. 1, the image data in the Isochronous channel 122 has difficulty in maintaining synchronization with the command/parameter coming through the Asynchronous channel 124, and will cause the image to-be out of sync or even crash the ultrasound system. In general, in the PCI-interface conventional system, the implementer needs to design a PCI add-on card in the PC motherboard and needs to maintain very critical timing requirements for every bit, using a large number of wires in parallel.

What is needed are an improved method and system for a medical imaging system that includes robust data transport. Embodiments of the present invention include a method and a system for data transport in a medical imaging system, for example, an ultrasound medical imaging system. Embodiments of the present invention also include a medical imaging method and a medical imaging system that include method and system for the data transport.

According to one embodiment of the present invention, there is a system for ultrasound medical imaging. The system includes a first and a second ultrasound information processing device. The first ultrasound information processing device is configured to packetize ultrasound image data of at least one ultrasound imaging mode into a stream of data frames and to convey the stream of data frames via a serial communication channel. Each of multiple data frames over a duration of the stream of data frames includes indication of the ultrasound imaging mode and includes ultrasound-imaging-mode-specific imaging parameters. The imaging parameters included by the each of multiple data frames are descriptive of structure or time sequence of image data within the each of multiple data frames. The second ultrasound information processing device is configured to receive the stream of data frames via the serial communication channel, and to recognize ultrasound imaging mode of received image data and structure of received image data from indications within a data frame that contained the received image data.

According to one embodiment of the present invention, there is a method for ultrasound medical imaging. The method includes the acts of: transmitting ultrasound acoustic waves into the body of a patient; receiving and processing, according to one or more ultrasound imaging modes, echoes reflected from structures within the patient's body to form ultrasound image data; packaging ultrasound image data of at least one ultrasound imaging mode into a stream of data frames, each of multiple data frames over a duration of the stream of data frames including indication of the ultrasound imaging mode and including ultrasound-imaging-mode-specific imaging parameters, the imaging parameters within the each of multiple data frames being descriptive of structure or time sequence of image data within the each of multiple data frames; conveying the stream of data frames via a serial communication channel; receiving the stream of data frames via the serial communication channel; recognizing ultrasound imaging mode of received image data and structure of received image data from indications within a data frame that contained the received image data; processing the received image data, based on recognized mode and structure of the received image data; and displaying the processed received image data.

According to one embodiment of the present invention, there is a computer memory product. The computer memory product includes: at least one computer readable storage medium; first computer code stored on the at least one computer readable storage medium; and second computer code stored on the at least one computer readable storage medium. The first computer code includes instruction to at least a first computer processor to: package ultrasound image data of at least one ultrasound imaging mode into a stream of data frames, each of multiple data frames over a duration of the stream of data frames including indication of the ultrasound imaging mode and including ultrasound-imaging-mode-specific imaging parameters, the imaging parameters within the each of multiple data frames being descriptive of structure or time sequence of image data within the each of multiple data frames; and convey the stream of data frames via a serial communication channel. The second computer code includes instruction to at least a second computer processor to: receive the stream of data frames via the serial communication channel; recognize ultrasound imaging mode of received image data and structure of received image data from indications within a data frame that contained the received image data; and process the received image data, based on recognized mode and structure of the received image data, to facilitate display of the received image data.

BRIEF DESCRIPTION OF THE DRAWINGS

In order to more extensively describe some embodiment(s) of the present invention, reference is made to the accompanying drawings. These drawings are not to be considered limitations in the scope of the invention, but are merely illustrative.

DETAILED DESCRIPTION OF SPECIFIC EMBODIMENTS

Medical imaging systems are known. For example, ultrasound imaging is discussed in U.S. Pat. Nos. 6,248,071 and 6,547,730, which are hereby incorporated by reference in their entirety for all purposes.

According to some embodiments of the present invention, there is a data transport for a real-time medical imaging system (e.g., ultrasound) that consolidates medical imaging data and control parameters into a single communication channel in a serial bus interface in a robust manner.

Figure 1:
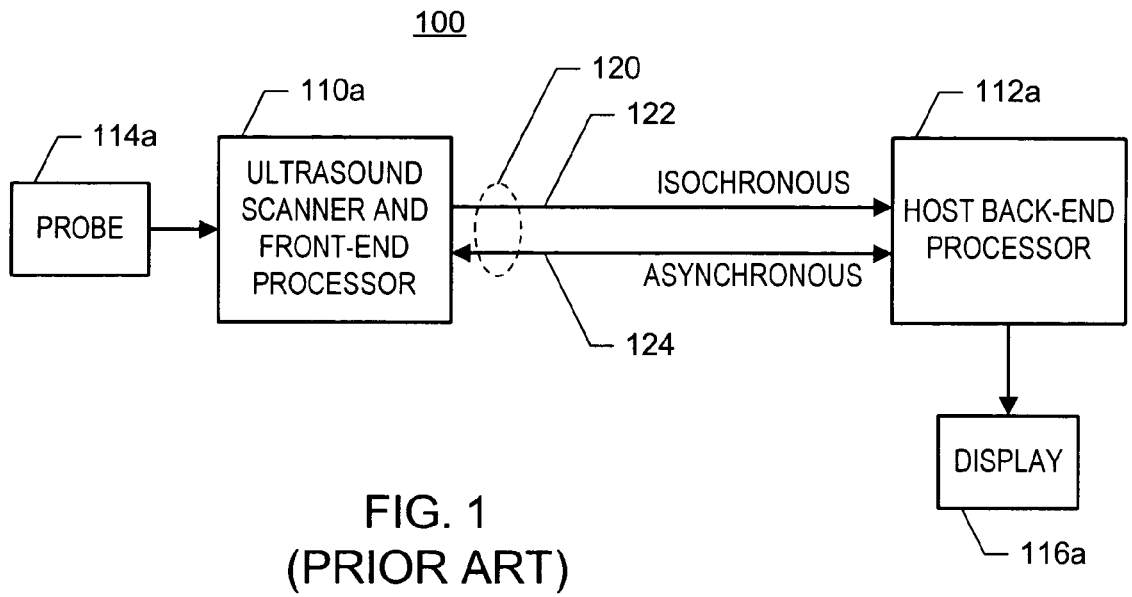
FIG. 1 schematically illustrates a conventional ultrasound imaging system.
Figure 2:
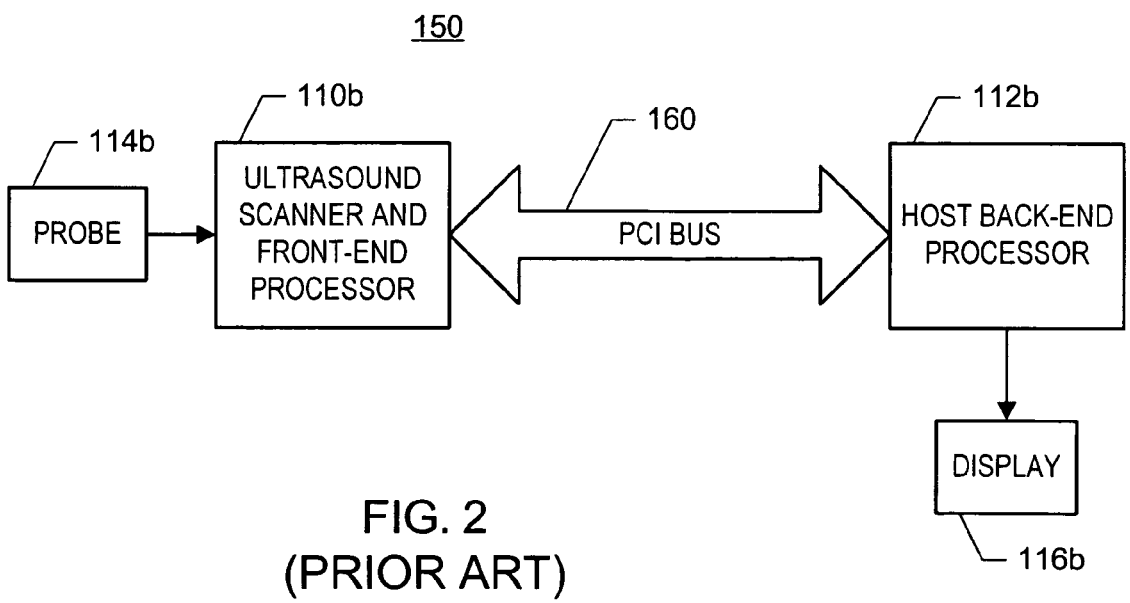
FIG. 2 schematically illustrates another conventional ultrasound imaging system.
Figure 3:
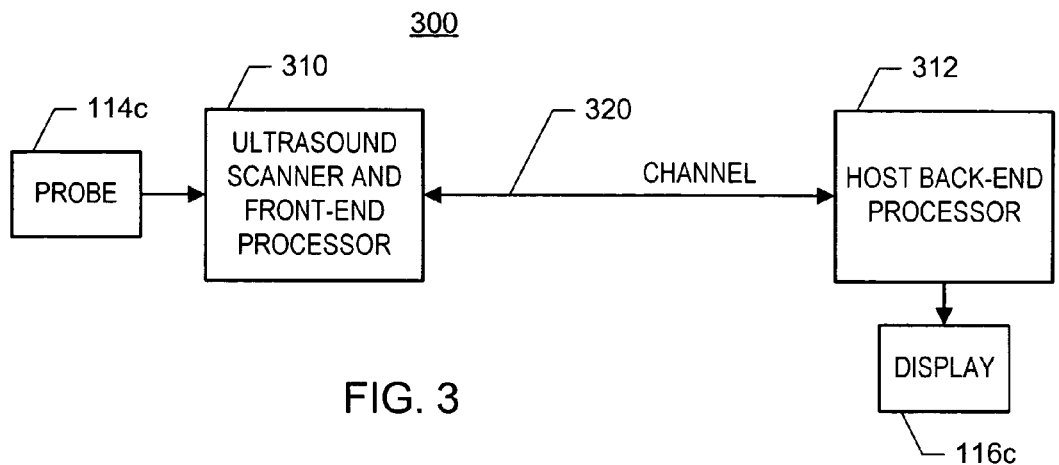
FIG. 3 schematically illustrates an ultrasound imaging system according to an embodiment of the present invention.

FIG. 3 schematically illustrates an ultrasound imaging system 300 according to an embodiment of the present invention. The system 300 includes: a front-end portion 310 that includes a scanner and a processor, and a back-end portion 312 that includes a processor. The front-end portion 310 includes, or works with, an ultrasound probe 114c. The back-end portion 312 includes, or works with, a display 116c. The componentry and imaging algorithms of the front-end portion 310 and the back-end portion 312 can be according to any known type. However, the front-end portion 310 and the back-end portion 312 include information processing devices that are configured to communicate information in accordance with the present document.

The system 300 is configured to use, for example, a serial bus (for example, USB 2.0 or IEEE1394 FireWire™) for ultrasound image data transfer between the front-end portion 310 and the back-end portion 312. The system 300 is configured to be able to utilize a channel 320 of the serial bus, during use of the system 300. For example, the channel 320 is preferably a non-Isochronous channel, and the system 300 is preferably configured to be able to utilize the non-Isochronous channel (320) of the serial bus, during use of the system 300, without requiring utilization of any Isochronous channel that the serial bus might or might not be configured to provide. For example, the non-Isochronous channel (320) may be an Asynchronous channel, and the Asynchronous channel is preferably used to transfer both image packets and Command and Control parameters. Preferably, the Asynchronous channel is one that includes error detection or error control capability to help enable a receiver of communications to ensure guaranteed correct and complete communication.

Command and Control parameters include, for example, instructions to switch into particular modes, as well as mode-specific parameters (e.g., frame size, number of zones, and the like) that define how to interpret the image packets of the Asynchronous channel. For example, the system 300 is configured to use the Asynchronous channel to transfer both image packets and Command and Control parameters, according to a data packet frame structure.

According to some embodiments of the present invention, the image data is pre-processed and packetized (e.g., including data compression) into a small volume, and a header section with the control parameter can be attached in the image packet, and together the image and control information is sent through the Asynchronous channel. The image data will be always in sync with the control parameters associated with that specific image packet during the transition of the scan mode changes. The imaging packet won't be out of sync with the control parameters during the scan mode changes. Further, the processing burden on the controller (e.g., on a controller running a Linux operating system kernel, or any other competent operating system) is lessened. For example, the device driver (e.g., a Linux device driver) does not have to maintain two ports, one for Isochronous and the other for Asynchronous. For another example, the controller does not have to use elaborate (and imperfect) schemes to try to synchronize imaging packages and their corresponding control information.

With pre-processing and image data packetization, the image data size is first significantly reduced, and both image data and parameters are fitted into a low throughput rate Asynchronous channel. The system does not have to rely on both an Isochronous and an Asynchronous channel for the ultrasound system image transfer. It can maintain a good synchronization on the image data packet and control parameters. The net channel bandwidth requirement can be reduced down to 200 Mb/s over the serial bus interface such as USB or IEEE1394, for many typical imaging sizes and image rates. Depending on the available bandwidth, compression, of course, may not be necessary. If compression is used, any type of data compression may be used. For example, compression based on the cosine transform (which is commonly used in the JPEG image compression scheme), may be employed.

Accordingly, simply the Asynchronous port is used to transfer both image and control data in between ultrasound front end and back end units. No Isochronous or PCI parallel bus are required. In an ultrasound system, the mode (e.g. B, Color, Doppler, M, etc.) changes in real time. It is conventionally extremely difficult to keep the parameter/command in sync with the ultrasound image data, and the designer uses an Isochronous channel for the image transfer in a serial communication bus or uses a parallel PCI bus for image transfer. In some of our embodiments, pre-processing and packaging are used (e.g., including data compression), and both the image data and the control parameters associated with the data packet are consolidated into one packet that is fitted into a low throughput rate Asynchronous channel and also prevent the image from being out of sync with the parameter and crashing the system. No separate Isochronous channel is required.

In one example implementation, preprocessing includes reducing front-end sampling data (e.g., 8000 per vector) to display pixel density (e.g. 400 per vector and 128 vector per frame) to send only the data which are visible on the display).

As has been discussed, an isochronous channel is preferably not required and not used. In one embodiment, even if an isochronous channel is for some reason nevertheless used, then still a non-Isochronous channel, e.g., an Asynchronous channel is used to transfer at least half of all ultrasound images being transferred during a typical user session.

Figure 4A:
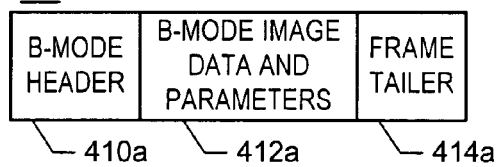
FIGS. 4A-4D schematically illustrate data frame structure for data frames used during B-mode imaging, B+C-mode imaging, B+D-mode imaging and B+M-mode imaging.
Figure 4B:
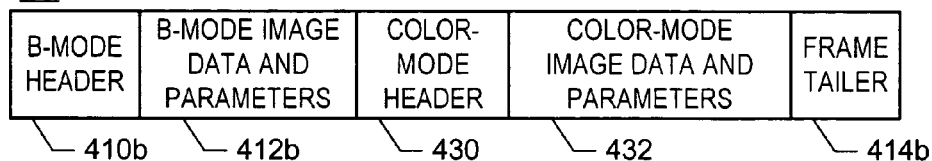
Figure 4C:
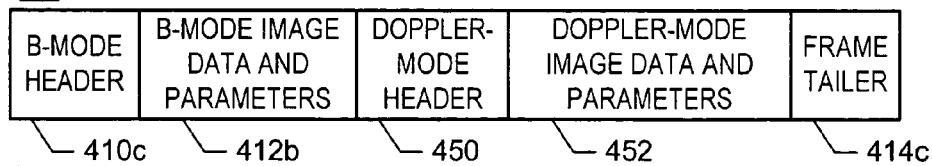
Figure 4D:
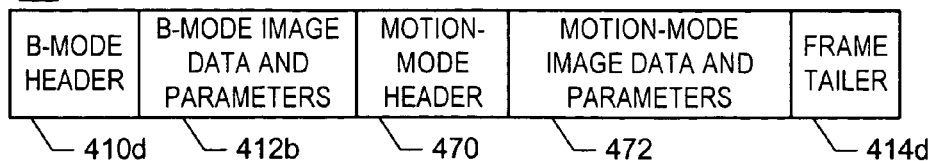

FIGS. 4A, 4B, 4C and 4D schematically show example data frame structures according to an embodiment of the present invention. FIG. 4A schematically shows data frame structure for a data frame 400 that is used during B-mode imaging. The data frame 400 includes: a B-mode header 410a, data 412a that includes B-mode image data and B-mode parameters, and a frame tailer 414a. FIG. 4B schematically shows data frame structure for a data frame 420 that is used during B+C-mode imaging. The data frame 420 includes: a B-mode header 410b, data 412b that includes B-mode image data and B-mode parameters, a C-mode-specific header 430, data 432 that includes C-mode image data and C-mode parameters, and a frame tailer 412b. FIG. 4C schematically shows data frame structure for a data frame 440 that is used during B+D-mode imaging. The data frame 440 includes: a B-mode header 410c, data 412c that includes B-mode image data and B-mode parameters, a D-mode-specific header 450, data 452 that includes D-mode image data and D-mode parameters, and a frame tailer 412c. FIG. 4D schematically shows data frame structure for a data frame 460 that is used during B+M-mode imaging. The data frame 460 includes: a B-mode header 410d, data 412d that includes B-mode image data and B-mode parameters, an M-mode header 450, data 452 that includes M-mode image data and M-mode parameters, and a frame tailer 412d.

As can be seen, each block of image data (e.g., within data 412a-d, 432, 452 or 472) are accompanied very nearby (e.g., within a same data frame) by corresponding command and control information that indicates to the recipient of the block how to interpret the block (e.g., what imaging mode the block is, number of parameters, the parameters, and the like). For example, one block of B-mode imaging data may correspond to a single two-dimensional image. In a combination imaging mode (e.g., B+C, B+D, B+M, B+C+D, etc.), successive data frames would implement an interleaving of the data of the different imaging modes being combined, e.g., B-C-B-C-B-C-... for B+C mode (see. FIG. 4B) or (not shown) B-C-D-B-C-D-B-C-D-... for B+C+D mode.

The recipient (e.g., back-end portion 312 in FIG. 3) of data frames of imaging data according to the scheme of FIG. 3 can process the imaging data according to the command and control information that appears in a header and in parameters of the same data frame of the imaging data. In this way, at the recipient, the state of the system, which state reflects the sum history of command and control information up to a particular time, maintains synchronization with the actual image data that corresponds to the state of the system.

As is clear from the above, an ultrasound system according to an embodiment of the present invention can be a conventional ultrasound system that is modified to communicate information in accordance with the present document. Thus, the processors in the front-end and back-end portions of such an ultrasound system are provided with software stored in computer memory media that instruct those processors to execute some of the methodologies described in the present document. An embodiment of the present invention is a computer memory product that includes any of such instructions. An embodiment of the present invention is either the front-end portion by itself, or parts thereof, or the back-end portion by itself, or parts thereof.

For example, in an embodiment, a front-end processor is to be instructed to packetize image data and parameters of a particular imaging mode into a data frame that includes a header, the header indicating at least the imaging mode. In a usage session, even when the operator does not change the imaging mode being used, multiple data frames (e.g., successive data frames) being transmitted will nevertheless each indicate the imaging mode, and will still each include imaging-mode-specific image parameters. In some sense, such indicated and included information in the multiple data frames can be considered redundant. If a combination mode is being implemented, then the blocks of imaging data for the different modes being combined are interleaved. For example, one data frame may include blocks of imaging data for all the different imaging modes being combined. That one data frame includes header and parameter information for the blocks of imaging data within that data frame. For example, each block within that one data frame may have its own header (as shown in FIGS. 4B, 4C and 4D).

The description and the drawings of the present document describe examples of embodiment(s) of the present invention and also describe some exemplary optional feature(s) and/or alternative embodiment(s). It will be understood that the embodiments described are for the purpose of illustration and are not intended to limit the invention specifically to those embodiments. For example, ultrasound embodiments were discussed, but the invention may also be embodied for any other type of medical imaging system. Rather, the invention is intended to cover all that is included within the spirit and scope of the invention, including alternatives, variations, modifications, equivalents, and the like.

What is claimed is:

1. A system for ultrasound medical imaging, the system comprising:
a first ultrasound information processing device configured to packetize ultrasound image data of at least one ultrasound imaging mode into a stream of data frames and to convey said stream of data frames via a single serial communication channel such that over a duration multiple data frames are conveyed, each data frame comprising a header and a body, wherein the ultrasound image data is reduced such that only the ultrasound image data which is visible on a display is conveyed;

wherein the multiple data frames of said stream of data frames includes an indication of the at least one ultrasound imaging mode in the header, image data, and ultrasound-imaging-mode-specific imaging parameters, the ultrasound-imaging-mode-specific imaging parameters comprising a control parameters, the image data and control parameters arranged to remain in sync during scan mode changes, the image data stored in the body, the control parameter stored in the header; and a second ultrasound information processing device configured to receive said stream of data frames via said single serial communication channel, to recognize the indication of the at least one ultrasound imaging mode and to interpret the control parameter to process the image data, wherein each data frame indicates the ultrasound imaging mode associated with the ultrasound image data in each respective data frame.

2. A system according to claim 1, wherein said serial communication channel comprises an asynchronous channel, and said stream of data frames is communicated via said asynchronous channel.

3. A system according to claim 2, wherein said asynchronous channel is configured to include error control capability.

4. A system according to claim 1, wherein an isochronous serial communication channel is not required for communicating ultrasound image data from said first ultrasound information processing device to said second ultrasound information processing device.

5. A system according to claim 1, configured wherein said serial communication channel comprises a non-isochronous channel, and at least half of all ultrasound image data conveyed from said first ultrasound information processing device to said second ultrasound information processing device during a user session is communicated via said non-isochronous channel.

6. A system according to claim 1, wherein said first ultrasound information processing device is configured wherein said duration of said stream of data frames is one over which a human operator receiving the stream of data frames has not changed the at least one ultrasound imaging mode.

7. A system according to claim 1, wherein said first ultrasound information processing device is configured, when brightness mode, hereinafter referred to as B-mode, is desired by the human operator, to produce a stream of data frames that each have a first header that indicates B- mode, a body that includes B-mode image data and B-mode parameters, and a frame tailer; and wherein said first ultrasound information processing device is configured, when brightness-and-color mode, hereinafter referred to as B+C-mode, is desired by the human operator, to produce a stream of data frames that each have a second header that indicates B-mode, a body that includes B-mode image data and B-mode parameters, a third header that indicates color mode, hereinafter referred to as C-mode, a body that includes C-mode image data and C-mode parameters, and a frame tailer.

8. A system according to claim 7, wherein said first ultrasound information processing device is configured, when brightness-and-doppler mode, hereinafter referred to as B+D-mode, is desired by the human operator, to produce a stream of data frames that each have a first header that indicates B-mode, a body that includes B-mode image data and B-mode parameters, a second header that indicates doppler mode, hereinafter referred to as D-mode, a body that includes D-mode image data and D-mode parameters, and a frame tailer.

9. A method for ultrasound medical imaging, the method comprising:

transmitting ultrasound acoustic waves into a body of a patient using a probe;

receiving and processing, according to at least one ultrasound imaging mode, echoes reflected from structures within the body to form ultrasound image data using the probe;

packaging ultrasound image data of the at least one ultrasound imaging mode into a stream of data frames such that over a duration multiple data frames are conveyed, wherein each data frame comprises a header and a body, the multiple data frames of said stream of data frames including an indication of the at least one ultrasound imaging mode in the header and including ultrasound-imaging-mode-specific imaging parameters, the ultrasound-imaging-mode-specific imaging parameters within the multiple data frames comprising control parameters, the image data and control parameters arranged to remain in sync during scan mode changes, the image data stored in the body, the control parameter stored in the header;

reducing the ultrasound image data such that the stream of data frames only includes the ultrasound image data which will be displayed;

conveying said stream of data frames via a single serial communication channel, wherein said single serial communication channel comprises a non-isochronous channel, wherein each data frame indicates the ultrasound imaging mode associated with the ultrasound image data in each respective data frame;

receiving said stream of data frames via said single serial communication channel;

recognizing the at least one ultrasound imaging mode of received image data from the indication;

processing the received image data, based on the recognized ultrasound imaging mode and the control parameter to form processed received image data; and displaying the processed received image data.

10. A method according to claim 9, wherein said non-isochronous channel comprises an asynchronous channel, and said conveying step comprises conveying said stream of data frames via said asynchronous channel.

11. A method according to claim 10, wherein said asynchronous channel is configured with error control capability.

12. A method according to claim 9, wherein an isochronous serial communication channel is not required for said conveying, receiving, or recognizing steps.

13. A method according to claim 9, wherein said non-isochronous channel comprises an asynchronous channel, and said conveying step comprises conveying via said non-isochronous channel at least half of all image data to be conveyed from said first ultrasound information processing device to said second ultrasound information processing device during a user session.

14. A method according to claim 9, wherein said packaging step is as described even when said duration of said stream of data frames is one over which a human operator receiving the stream of data frames has not changed the at least one-ultrasound imaging mode.

15. A method according to claim 9, wherein said packaging step comprises, when brightness mode, hereinafter referred to as B-mode, is desired by the human operator, producing a stream of data frames that each have a first header that indicates B-mode, a body that includes B-mode image data and B-mode parameters, and a frame tailer;

and wherein said packaging step comprises, when brightness-and-color mode, hereinafter referred to as B+C-mode, is desired by the human operator, producing a stream of data frames that each have a second header that indicates B-mode, a body that includes B-mode image data and B-mode parameters, a third header that indicates color mode, hereinafter referred to as C-mode, a body that includes C-mode image data and C-mode parameters, and a frame tailer.

16. A method according to claim 15, wherein said packaging step comprises, when brightness-and-doppler mode, hereinafter referred to as B+D-mode, is desired by the human operator, producing a stream of data frames that each have a first header that indicates B-mode, a body that includes B-mode image data and B-mode parameters, a second header that indicates doppler mode, hereinafter referred to as D-mode, a body that includes D-mode image data and D-mode parameters, and a frame tailer.

17. A computer memory product, comprising:

at least one computer readable storage medium;

first computer code stored on said at least one computer readable storage medium, the first computer code including instruction to at least a first computer processor to:

package ultrasound image data of the at least one ultrasound imaging mode into a stream of data frames such that over a duration multiple data frames are conveyed, wherein each data frame comprises a header and a body, the multiple data frames of said stream of data frames including an indication of the at least one ultrasound imaging mode in the header and including ultrasound-imaging-mode-specific imaging parameters; the ultrasound-imaging-mode-specific imaging parameters comprising a control parameter, the image data and control parameters arranged to remain in sync during scan mode changes, the image data stored in the body, the control parameter stored in the header and reduce the ultrasound image data such that said stream of data frames only includes the ultrasound image data which will be displayed and convey said stream of data frames via a single serial communication channel, wherein said single serial communication channel comprises a non-isochronous channel, wherein each data frame indicates the ultrasound imaging mode associated with the ultrasound image data in each respective data frame; and second computer code stored on said at least one computer readable storage medium, the second computer code including instruction to at least a second computer processor to:

receive said stream of data frames via said single serial communication channel;

recognize the at least one ultrasound imaging mode of received image data from the indication within a data frame that contained said received image data; and process the received image data, based on the recognized ultrasound imaging mode and the control parameter, to facilitate display of the received image data.

18. A computer memory product according to claim 17, wherein said instruction to convey comprises instruction to convey said stream of data frames via an asynchronous channel.

19. A computer memory product according to claim 18, wherein said instruction to convey does not require an isochronous serial communication channel.

20. A computer memory product according to claim 17, wherein said instruction to at least a first computer processor is configured for said instruction to package to be executed even over an instance of said stream of data frames over which desired ultrasound imaging mode remains unchanged by a human operator who is viewing displayable image data.

* * * * *